United States Patent
Clingerman et al.

(10) Patent No.: US 9,379,396 B2
(45) Date of Patent: Jun. 28, 2016

(54) CONTROLS GIVING −25° C. FREEZE START CAPABILITY TO A FUEL CELL SYSTEM

(75) Inventors: Bruce J. Clingerman, North Rose, NY (US); Aaron Rogahn, Rochester, NY (US); Jun Cai, Rochester, NY (US); Joseph C. Gerzseny, Spencerport, NY (US); Manish Sinha, Pittsford, NY (US); Steven D. Burch, Honeoye Falls, NY (US); Abdullah B. Alp, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1481 days.

(21) Appl. No.: 12/764,749

(22) Filed: Apr. 21, 2010

(65) Prior Publication Data

US 2011/0262822 A1 Oct. 27, 2011

(51) Int. Cl.
  *H01M 8/04228* (2016.01)
  *H01M 8/043* (2016.01)
  *H01M 8/04303* (2016.01)
  *H01M 8/04955* (2016.01)
  *H01M 8/04828* (2016.01)
  *H01M 8/04* (2016.01)
  *H01M 8/10* (2016.01)

(52) U.S. Cl.
  CPC ........ *H01M 8/04223* (2013.01); *H01M 8/0485* (2013.01); *H01M 8/04111* (2013.01); *H01M 8/04253* (2013.01); *H01M 8/04529* (2013.01); *H01M 8/04753* (2013.01); *H01M 8/04843* (2013.01); *H01M 8/04955* (2013.01); *H01M 2008/1095* (2013.01); *Y02E 60/50* (2013.01)

(58) Field of Classification Search
  None
  See application file for complete search history.

(56) References Cited

U.S. PATENT DOCUMENTS

| 5,645,950 | A * | 7/1997 | Benz et al. ............. 429/429 |
| 8,088,523 | B2 | 1/2012 | Chowdhury |
| 8,178,252 | B2 | 5/2012 | Thompson |
| 2006/0121322 | A1 * | 6/2006 | Haas et al. ............. 429/13 |
| 2007/0248847 | A1 * | 10/2007 | Haas et al. ............. 429/13 |
| 2009/0305088 | A1 | 12/2009 | Chowdhury |

OTHER PUBLICATIONS

Tatiana et al, Effect of Membrane Characteristics and Humidification Conditions on the Impedance Response of Polymer Electrolyte Fuel Cells, 57-68 J. Electroanal. Chem. 503 (2001).*

* cited by examiner

*Primary Examiner* — Yoshitoshi Takeuchi
(74) *Attorney, Agent, or Firm* — John A. Miller; Miller IP Group, PLC

(57) ABSTRACT

A method for shutting down a fuel cell system including operating a fuel cell stack. the method includes providing an increased cathode air flow so as to dry fuel cell membranes in the stack until a first desired level of high frequency resistance is achieved, rehydrating the cell membranes of the stack until a second desired level of high frequency resistance is achieved, and operating the stack with a decreased cathode input relative humidity until a third desired level of high frequency resistance is achieved.

20 Claims, 2 Drawing Sheets

CONTROLS GIVING −25° C. FREEZE START CAPABILITY TO A FUEL CELL SYSTEM

BACKGROUND OF THE INVENTION

1. Field of the Invention

This invention relates generally to a method for shutting down a fuel cell system to ensure freeze start capability and, more particularly, to a method for shutting down a fuel cell system to ensure reliable freeze start capability at temperatures as low as −25° C.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes, or catalyst layers, typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform humidity distribution. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include anode side and cathode side flow distributors, or flow fields, for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have a certain water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the GDL, is particularly troublesome at low stack output loads.

As mentioned above, water is generated as a by-product of the stack operation. Therefore, the cathode exhaust gas from the stack will typically include water vapor and liquid water. It is known in the art to use a water vapor transfer (WVT) unit to capture some of the water in the cathode exhaust gas, and use the water to humidify the cathode input airflow. Water in the cathode exhaust gas at one side of the water transfer elements, such as membranes, is absorbed by the water transfer elements and transferred to the cathode air stream at the other side of the water transfer elements.

High frequency resistance (HFR) is a well-known property of fuel cells, and is closely related to the ohmic resistance, or membrane protonic resistance of the fuel cell membrane. Ohmic resistance is itself a function of the degree of fuel cell membrane humidification. Therefore, by measuring the HFR of the fuel cell membranes of a fuel cell stack within a specific band of excitation current frequencies, the degree of humidification of the fuel cell membrane may be determined.

As discussed above, a membrane that is too wet may cause problems due to water accumulation within the gas flow channels and, during low temperature environments, freezing of the water in the fuel cell stack may produce ice that blocks flow channels thereby affecting system restarts. When a fuel cell system starts with a frozen stack, the stack generates internal waste heat and begins to warm up. The stack also generates water during the warm-up process. There is generally a race between the stack heating up and the stack generating water. If too much water is made before enough heat is generated, the water may freeze in the stack and block gas flow, causing cell voltages to drop, which may cause the fuel cell system to shutdown.

If a fuel cell stack has too much water in it from the last system shutdown, the water generated during a long start-up may block gas flow channels. Typically, the colder the stack is at start-up the longer it takes to adequately heat up and the more likely that the water generated during start up will block the gas flow channels. Therefore, at very cold start-up temperatures, such as below −15° C., it takes longer for the fuel cell stack to heat up to 0° C. Consequently, the shutdown method becomes very critical for a successful restart of the fuel cell stack, particularly when the fuel cell stack temperature is −15° C. or colder.

A typical method for shutting down a fuel cell system is to purge the cathode side with high air flow, thereby pushing and evaporating water out of the fuel cell system. The cathode side air flow purge is typically done until the HFR reaches a specific level of dryness. The higher the HFR value, the drier the membranes, and the specific level of HFR typically used to dry the stack upon shutdown, which is approximately 225 mΩ·cm$^2$, is insufficient. Therefore, there is a need in the art for a more robust shutdown strategy when temperature conditions are below freezing. Furthermore, there is a need to ensure that the fuel cells of the fuel cell stack are dried in a uniform way to minimize cell to cell humidity gradients as well as fuel cell stack inlet to fuel cell stack outlet humidity gradients.

SUMMARY OF THE INVENTION

In accordance with the teachings of the present invention, a method for shutting down a fuel cell stack is disclosed. The method includes operating the fuel cell stack with an increased cathode air flow so as to dry fuel cell membranes in the stack until a first desired level of high frequency resistance is achieved, rehydrating the cell membranes of the stack until a second desired level of high frequency resistance is achieved, and operating the stack with a decreased cathode input relative humidity until a third desired level of high frequency resistance is achieved.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for shutting down a fuel cell system is merely exemplary in nature, and is in no way intended to limit the invention or its applications or uses.

Figure 1:
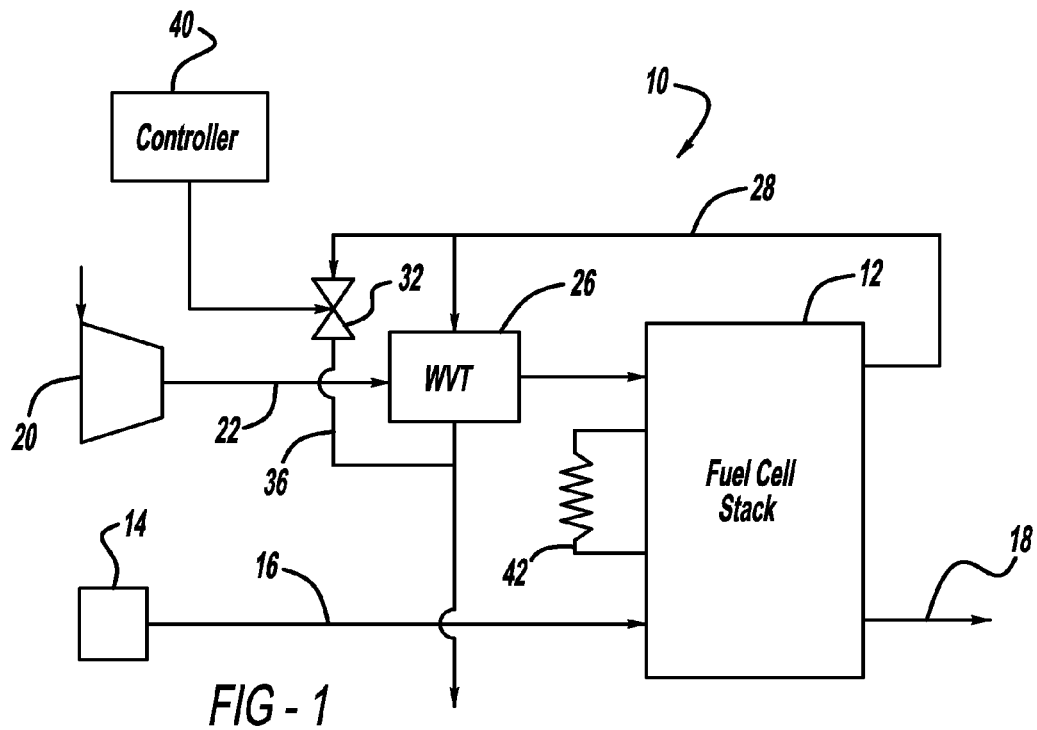
FIG. 1 is a schematic block diagram of a fuel cell system.

FIG. 1 is a schematic block diagram of fuel cell system 10 including a fuel cell stack 12. The fuel cell stack 12 receives hydrogen from a hydrogen source 14 on an anode input line 16 and an anode exhaust gas is exhausted from the stack 12 on an anode exhaust gas line 18. A compressor 20 provides an air flow to the cathode side of the fuel cell stack 12 on cathode input line 22 through a water vapor transfer (WVT) unit 26 that humidifies the cathode input air. A cathode exhaust gas is output from the stack 12 on a cathode exhaust gas line 28. The cathode exhaust gas line 28 directs the cathode exhaust to the WVT unit 26 to provide the humidity to humidify the cathode input air. A by-pass line 36 is provided around the WVT unit 26 and a by-pass valve 32 is provided in the by-pass line 36 and is controlled to selectively redirect the cathode exhaust gas through or around the WVT unit 26 to provide the desired amount of humidity to the cathode input air. A controller 40 controls the by-pass valve 32 and the compressor 20. A high frequency resistance (HFR) sensor 42 measures the HFR of the fuel cell stack 12, thereby allowing the cell membrane humidification level of the fuel cell stack 12 to be determined by the controller 40.

Figure 2:
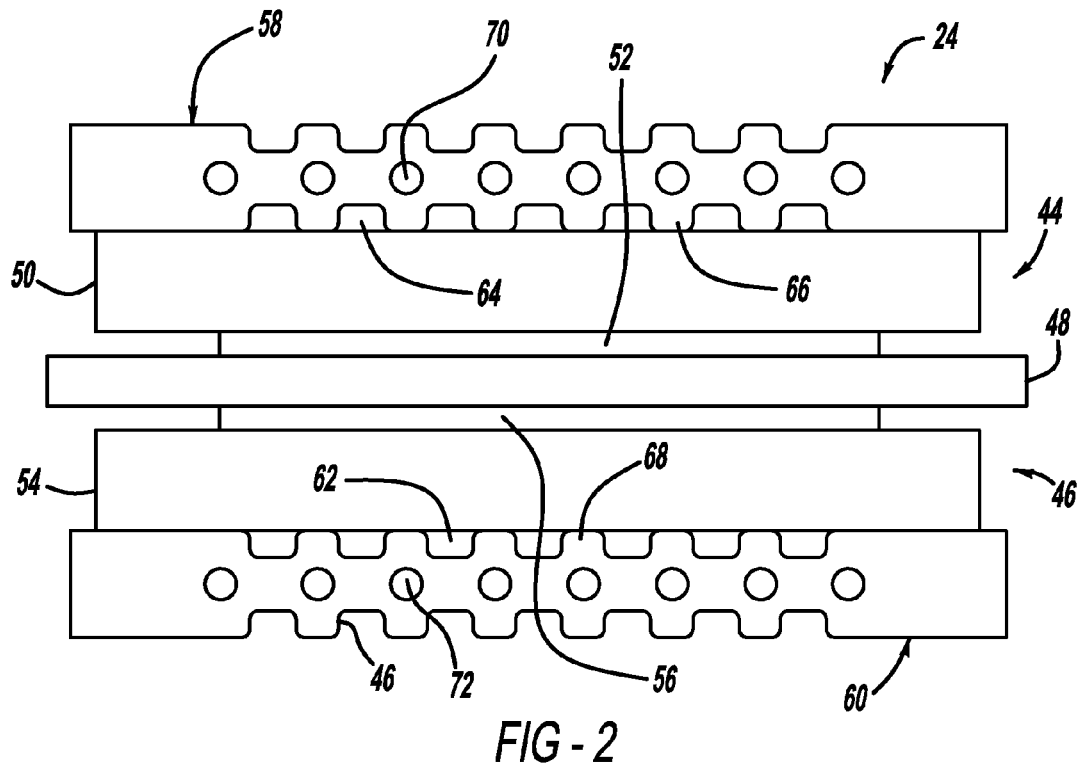
FIG. 2 is a cross-sectional view of a fuel cell.

FIG. 2 is a cross-sectional view of a fuel cell 24 that is part of a fuel cell stack of the type discussed above. The fuel cell 24 includes a cathode side 44 and an anode side 46 separated by an electrolyte membrane 48. A cathode side diffusion media layer 50 is provided on the cathode side 44, and a cathode side catalyst layer 52 is provided between the membrane 48 and the diffusion media layer 50. Likewise, an anode side diffusion media layer 54 is provided on the anode side 46, and an anode side catalyst layer 56 is provided between the membrane 48 and the diffusion media layer 54. The catalyst layers 52 and 56 and the membrane 48 define an MEA. The diffusion media layers 50 and 54 are porous layers that provide for input gas transport to and water transport from the MEA. Various techniques are known in the art for depositing the catalyst layers 52 and 56 on the diffusion media layers 50 and 54, respectively, or on the membrane 48.

A cathode side flow field plate or bipolar plate 58 is provided on the cathode side 44 and an anode side flow field plate or bipolar plate 60 is provided on the anode side 46. The bipolar plates 58 and 60 are provided between the fuel cells in the fuel cell stack. A hydrogen reactant gas flow from flow channels 62 in the bipolar plate 60 reacts with the catalyst layer 56 to dissociate the hydrogen ions and the electrons. Oxygen in the airflow from flow channels 64 in the bipolar plate 58 reacts with the catalyst layer 52. The hydrogen ions are able to propagate through the membrane 48 where they electro-chemically react with the oxygen in the airflow and the return electrons in the catalyst layer 52 to generate water as a by-product. The bipolar plate 58 includes lands 66 between the flow channels 64 and the bipolar plate 60 includes lands 68 between the flow channels 62. Cooling fluid flow channels 70 are provided in the bipolar plate 58 and cooling fluid flow channels 72 are provided in the bipolar plate 60.

Electrons from an adjacent cell (not shown) travel through the bipolar plate 58 to the cathode side catalyst layer 52. Protons move up through the membrane 48 and electrons move down through the bipolar plate and diffusion media layer to combine with the oxygen and produce water.

To achieve −25° C. freeze start capability in a fuel cell system, specific steps and control methods are utilized to ensure the stack 12 has an acceptable water content and water distribution at the end of an air purge during system shutdown, which are described in detail below. The method described below provides for acceptable water content and water distribution throughout the stack 12 without requiring individual fuel cell air flow control. The method described below may also be utilized at any temperature upon shutdown of the fuel cell system 10, however, it is most beneficial when the fuel cell stack 12 is likely to be exposed to temperatures below −15° C. after shutdown.

The shutdown method includes three main stages, which are: (1) a relatively long fuel cell stack dry-out stage; (2) a relatively short rehumidification stage for the fuel cell stack 12; and (3) a final dry-out stage of the fuel cell stack 12. Each of these stages are discussed in detail below. During all three of these stages the average HFR of the stack 12 is measured using the HFR sensor 42. Thus, the HFR, and consequently the amount of humidity, of each cell 24 in the stack 12 is not required to be known.

The first stage 1, which is a relatively long fuel cell stack dry-out stage, utilizes high cathode air flow from the compressor 20 until the fuel cell stack 12 dries to an average HFR that is drier than normal operating conditions, for example, approximately 400 mΩ-cm$^2$. Although 400 mΩ-cm$^2$ is drier than necessary for an individual fuel cell 24, it provides enough air flow and time for a wetter than average fuel cell 24 in the fuel cell stack 12 to rise to the desired level of a more typical measured HFR, for example, 225 mΩ-cm$^2$, as discussed in more detail below.

Figure 3A:
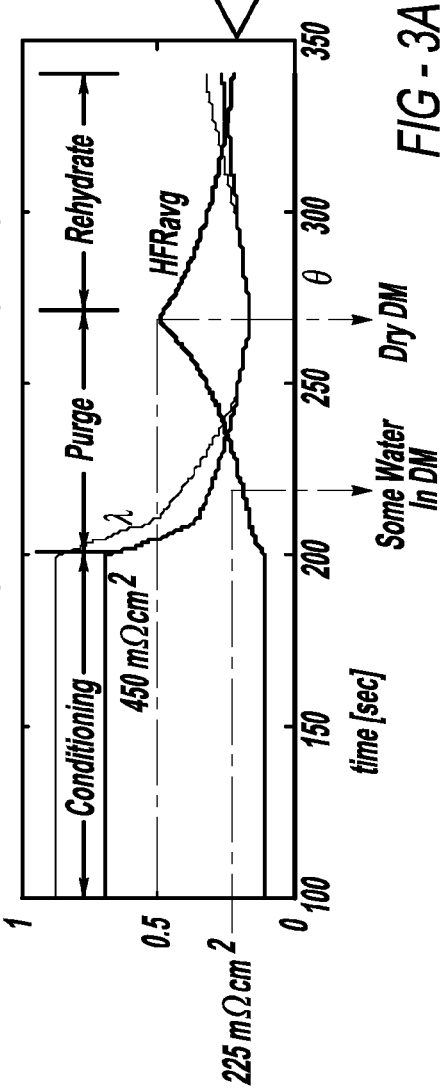
FIGS. 3A and 3B are graphs with time on the x-axis and high frequency resistance on the y-axis.
Figure 3B:
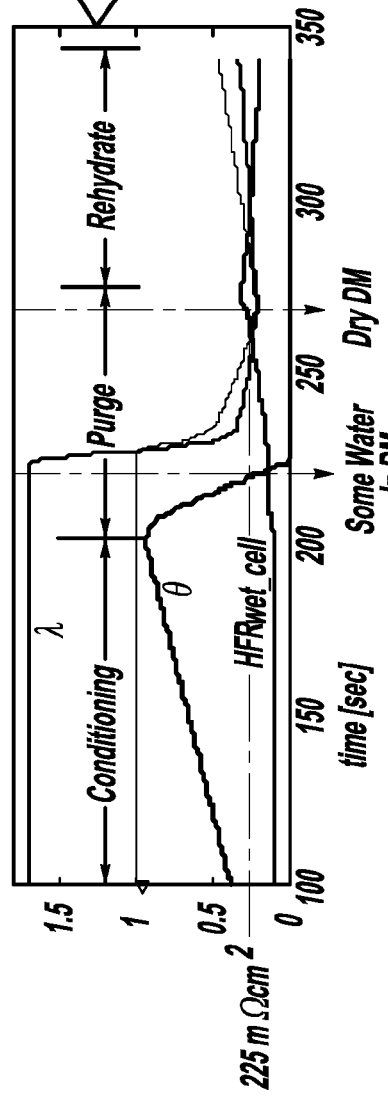

FIGS. 3A and 3B illustrate results based on a model comparing the dry-out between a normally hydrated fuel cell (FIG. 3A) and an extra wet fuel cell (FIG. 3B). As illustrated in FIG. 3A, the HFR of the normally hydrated fuel cell climbs to 400 mΩ-cm$^2$ at approximately the same time as the HFR of the extra wet cell in FIG. 3B finally gets to 225 mΩ-cm$^2$. The line 8 on the graphs 3A and 3B represents the quantity of water in the diffusion media, and helps to explain why the HFR of the wet fuel cell in FIG. 3B is lower than the HFR of the normally hydrated fuel cell in FIG. 3A. When the diffusion media layers 50 and 54 of the fuel cell 24 are void of water it is easy for the water in the membrane 48 to be drawn out through the diffusion media layer 50 and into the cathode air stream. However, if the diffusion media layer 50 of the fuel cell 24 contains water, the membrane 48 of the fuel cell 24 will not dry out as quickly because the cathode air flow is only capable of holding a limited amount of water. If the diffusion media layer 50 is supplying water to the cathode air flow, then the membrane 48 will remain wet.

The amount of water in the membrane 48 is illustrated by $\lambda$ in FIGS. 3A and 3B, where $\lambda$ is a ratio of water to $SO_3H^+$ in the membrane 48. A high $\lambda$, as illustrated in FIG. 3B, correlates to a relatively high amount of water in the membrane 48. The results of the model in FIGS. 3A and 3B illustrate that the extra wet cell of FIG. 3B will dry-out to the desired HFR of 225 $m\Omega$-$cm^2$ when the rest of the stack dries-out to an HFR of 400 $m\Omega$-$cm^2$. Thus, the fuel cell stack 12 must be dried to an HFR value that is greater than needed for system restart, such as approximately 400 $m\Omega$-$cm^2$, to ensure that the wet cells of the stack 12 dry-out enough to ensure reliable freeze start capability. While an average HFR value of 400 $m\Omega$-$cm^2$ is used as a target HFR value, this value is a calibratable value and the actual average HFR value used depends on the fuel cell system 10 used. The first stage as described above is also time dependent. Thus, if the desired average HFR value, such as an average HFR of 400 $m\Omega$-$cm^2$, is achieved too quickly or too slowly, the method may continue or discontinue the dry-out purge as desired to ensure the appropriate time window for performing a dry-out purge is achieved. The method may also adjust the speed of the compressor 20 to ensure the desired average HFR value is achieved within a predetermined window of time, as discussed in more detail below.

Stage 2 is a re-humidification step, and includes a low amount of cathode air to the fuel cell stack 12. This stage is included because if the fuel cell stack 12 is shutdown with an average HFR of 400 $m\Omega$-$cm^2$ the stack 12 may be too dry for the next start-up. An overly dry stack 12 is problematic because the membranes of the fuel cells 24 in the fuel cell stack 12 may have difficulty with proton conductivity, resulting in poor performance. Furthermore, durability of the fuel cell stack 12 is decreased when operating the fuel cell stack 12 dry, as pinhole formation in the membranes 48 or other damage to the fuel cell 24 may occur, such as voltage potential reversals of one or more of the fuel cells.

The re-humidification stage must occur relatively quickly to prevent any wet cells in the stack 12 from re-humidifying too much. The HFR lines in FIGS. 3A and 3B illustrate that the dry cells re-humidify more quickly than the wet cells, further indicating that a short re-humidification stage is adequate. The reason the drier fuel cells re-humidify more quickly is due to the wet cells receiving less cathode air flow due to water build-up in the diffusion media layer 50, as discussed above.

The ratio of time for stage 1 to stage 2 needs to be high, for example greater than 3:1, to achieve the desired uniform membrane relative humidity. In addition, during stage 1 and stage 2 the slope of the average HFR of the stack 12 is monitored. Thus, if HFR conditions prior to shutdown were relatively dry, stage 1 may achieve an average HFR of 400 $m\Omega$-$cm^2$ in too short of a time frame for the high compressor air flow utilized in stage 1. To avoid this situation, the average HFR of the stack 12 is monitored, and if the average HFR rises too quickly the controller 40 may reduce the speed of the compressor 20 to ensure the average HFR rises to the desired level within the desired time frame.

Stage 3 is a final dry-out stage and is similar to stage 1. During this stage high cathode air flow is utilized for the purpose of providing a final purge of water in the stack 12 and the balance of plant. Because the re-humidification of stage 2 is relatively short, it is expected that there is only a minimal amount of water which needs to be cleared from the stack 12 and the balance of plant. To allow for an adequate dry-out purge in stage 3, the re-humidification of stage 2 must drop below a predetermined average HFR value, such as below an average HFR of 225 $m\Omega$-$cm^2$. For example, the average HFR of the re-humidification of stage 2 may drop the average HFR of the stack 12 to 160 $m\Omega$-$cm^2$. If the re-humidification of stage 2 ends with an average HFR of 225 $m\Omega$-$cm^2$ or higher, then the final dry-out of stage 3 may put the stack 12 in an overly dry condition for a subsequent start-up. As discussed above, the average HFR chosen is a calibratable value.

Stages 1 and 2 have a very high inlet relative humidity, for example 60%, compared to a low inlet relative humidity during stage 3, for example 35%. Stage 2 is a re-humidification stage, thus a high inlet relative humidity is necessary to re-humidify the fuel cells 24. Stage 1 also needs a relatively high inlet relative humidity, compared to stage 3, to ensure the upstream side of the fuel cells do not dry out due to the high cathode air flow. The downstream side of the fuel cells tend to remain humidified because of the additional water created in the stack 12, which is carried downstream by the cathode air flow. Thus, high inlet relative humidity is utilized during stage 1 to ensure the inlet sides of the fuel cells remain adequately hydrated throughout stage 1.

It is important to have a clean HFR signal from the HFR sensor 42, because the end of each stage is based at least in part on HFR. If the speed of the compressor 20 changes, the HFR signal from the HFR sensor 42 tends to measure more noise. Therefore, according to this method, the controller 40 sets the speed of the compressor 20 during shutdown, rather than using an air flow set point. To achieve the desired air flow, the controller 40 characterizes the fuel cell system 10 and sets the correct speed of the compressor 20 to achieve the desired air flow.

The controller 40 also controls the method of restarting the fuel cell system 10. For example, if the system 10 is shutting down and the driver wants to restart the system 10, the restart should occur as quickly as possible. However, applying a load to the stack 12 with an average HFR greater than 225 $m\Omega$-$cm^2$ may damage the stack 12. To avoid this situation, the fuel cell system 10 has specific exit criteria in the event a restart is commanded before the method as described herein is complete. These specific exit criteria are described in more detail below.

For example, if a restart of the system 10 is commanded during stage 1 and the average HFR measured by the HFR sensor 42 is below 225 $m\Omega$-$cm^2$, stage 1 is aborted, stages 2 and 3 are skipped and the system 10 is allowed to restart. If, however, the restart is commanded during stage 1 and the average HFR is above 225 $m\Omega$-$cm^2$, stage 1 is aborted, stage 2 occurs until the average HFR reaches 225 $m\Omega$-$cm^2$ or lower, then stage 2 is aborted, stage 3 is skipped, and the system 10 is allowed to restart.

When a restart is commanded while the method as described above is in stage 2, stage 2 is aborted when the average HFR reaches 225 $m\Omega$-$cm^2$ or lower, stage 3 is skipped, and the fuel cell system 10 is allowed to restart. When a restart is commanded while the method is in stage 3, stage 3 is aborted and the fuel cell system 10 is allowed to restart.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for shutting down a fuel cell system, said method comprising:
   operating a fuel cell stack with an air flow so as to dry a plurality of fuel cell membranes in the stack to a predetermined average HFR within a predetermined window of time such that a first level of average high frequency resistance is achieved;
   rehydrating the cell membranes of the stack until a second level of average high frequency resistance is achieved;
   operating the stack with a predetermined cathode input relative humidity until a third level of average high frequency resistance is achieved; and
   shutting down the fuel cell system.

2. The method according to claim 1 wherein drying the plurality of membranes to a predetermined average HFR within a predetermined window of time is longer in duration than each of rehydrating the cell membranes of the stack and operating the stack with the predetermined cathode input relative humidity.

3. The method according to claim 1 wherein the ratio of the amount of time for drying the plurality of membranes to a predetermined average HFR within a predetermined window of time to the amount of time for rehydrating the cell membranes of the stack is at least 3:1.

4. The method according to claim 1 wherein drying the plurality of membranes to a predetermined average HFR within a predetermined window of time includes adjusting the speed of a compressor to achieve the first level of high frequency resistance in a predetermined window of time.

5. The method according to claim 1 wherein the cathode input relative humidity while operating the stack with the predetermined cathode input relative humidity is approximately 35%.

6. The method according to claim 1 wherein operating the stack with the predetermined cathode input relative humidity includes increasing the cathode air flow.

7. The method according to claim 1 further comprising setting the speed of a compressor to a cathode air flow so as to reduce high frequency resistance signal noise.

8. The method according to claim 1 further comprising a procedure for aborting the shutdown if a restart of the fuel cell system is requested before shutdown completes and the measured high frequency resistance is below a predetermined level.

9. A method for shutting down a fuel cell, said method comprising:
   setting the speed of a compressor to a cathode air flow so as to reduce high frequency resistance signal noise;
   operating the fuel cell with a cathode air flow so as to dry a membrane in the fuel cell to a predetermined average HFR within a predetermined window of time such that a first level of cell high frequency resistance is achieved, and measuring the cell high frequency resistance while operating the fuel cell with the cathode air flow;
   rehydrating the membrane of the fuel cell until a second level of cell high frequency resistance is achieved and measuring the cell high frequency resistance while rehydrating the membrane of the fuel cell;
   decreasing the cathode input relative humidity to a predetermined level and operating the fuel cell until a third level of cell high frequency resistance is achieved, and measuring the cell high frequency resistance while decreasing the cathode input relative humidity and operating the fuel cell; and
   shutting down the fuel cell.

10. The method according to claim 9 wherein operating the fuel cell with the cathode air flow so as to dry the membrane in the fuel cell is longer in duration than each of rehydrating the membrane of the fuel cell and decreasing the cathode input relative humidity to the predetermined level and operating the fuel cell.

11. The method according to claim 9 wherein the ratio of the amount of time for drying the membrane to the amount of time for rehydrating the cell membrane is at least 3:1.

12. The method according to claim 9 further comprising monitoring the duration of time of operating the fuel cell with the cathode air flow to dry the membrane in the fuel cell and adjusting the speed of a compressor as needed to achieve the first level of high frequency resistance in the predetermined window of time.

13. The method according to claim 9 wherein decreasing the cathode input relative humidity to the predetermined level and operating the fuel cell further includes increasing the cathode air flow above a predetermined level.

14. The method according to claim 9 wherein the cathode input relative humidity while decreasing the cathode input relative humidity to the predetermined level and operating the fuel cell is approximately 35%.

15. The method according to claim 9 further comprising a procedure for aborting the shutdown if a restart of the fuel cell is requested before shutdown completes and the measured high frequency resistance is below a predetermined level.

16. A method for shutting down a fuel cell system, said method comprising:
   setting the speed of a compressor to a first cathode air flow so as to reduce high frequency resistance signal noise;
   operating a fuel cell stack with an air flow so as to dry a plurality of fuel cell membranes in the stack to a predetermined average HFR within a predetermined window of time such that a first level of average high frequency resistance is achieved;
   rehydrating the cell membranes of the stack until a second level of average high frequency resistance is achieved;
   operating the stack with a predetermined cathode input relative humidity until a third level of average high frequency resistance is achieved, wherein operating the fuel cell with the cathode air flow so as to dry the plurality of fuel cell membranes is longer in duration than each of rehydrating the cell membranes of the stack and operating the stack with the predetermined cathode input relative humidity; and
   shutting down the fuel cell system.

17. The method according to claim 16 wherein the cathode input relative humidity while operating the stack with the predetermined cathode input relative humidity is approximately 35%.

18. The method according to claim 16 wherein the ratio of the amount of time for drying the plurality of membranes to a predetermined average HFR within a predetermined window of time to the amount of time for rehydrating the cell membranes of the stack is at least 3:1.

19. The method according to claim 16 further comprising a procedure for aborting the shutdown if a restart of the fuel cell system is requested before shutdown completes and the measured high frequency resistance is below a predetermined level.

20. The method according to claim 16 wherein the predetermined cathode input relative humidity is achieved by increasing the cathode air flow above a predetermined level.

* * * * *